(12) United States Patent
Hoshinaka et al.

(10) Patent No.: US 7,939,776 B2
(45) Date of Patent: May 10, 2011

(54) SWITCH MECHANISM AND DISK DEVICE

(75) Inventors: Eiji Hoshinaka, Tokorozawa (JP); Hitoshi Ueno, Tokorozawa (JP); Yukinari Makisaka, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 764 days.

(21) Appl. No.: 11/631,811

(22) PCT Filed: Jul. 7, 2005

(86) PCT No.: PCT/JP2005/012549
§ 371 (c)(1),
(2), (4) Date: Feb. 6, 2008

(87) PCT Pub. No.: WO2006/006484
PCT Pub. Date: Jan. 19, 2006

(65) Prior Publication Data
US 2008/0308399 A1 Dec. 18, 2008

(30) Foreign Application Priority Data
Jul. 9, 2004 (JP) .................................. 2004-203861

(51) Int. Cl.
*H01H 3/42* (2006.01)
(52) U.S. Cl. ..................................................... 200/574
(58) Field of Classification Search .................. 200/573, 200/574
See application file for complete search history.

(56) References Cited

U.S. PATENT DOCUMENTS

| | | | | | |
|---|---|---|---|---|---|
| 4,389,551 | A | * | 6/1983 | Deibele et al. | 200/51 R |
| 5,513,999 | A | * | 5/1996 | Fry et al. | 439/188 |
| 6,079,865 | A | * | 6/2000 | Plavcan et al. | 366/129 |
| 2002/0088700 | A1 | * | 7/2002 | Banfield et al. | 200/573 |

FOREIGN PATENT DOCUMENTS

| | | |
|---|---|---|
| JP | 58-100270 | 6/1983 |
| JP | 63-167468 | 7/1988 |
| JP | 05-074033 | 3/1993 |
| JP | 08-190428 | 7/1996 |
| JP | 2001-143351 | 5/2001 |

OTHER PUBLICATIONS

Microfilm of the specification and drawings annexed to the request of Japanese Utility Model Application No. 131897/1983 (Laid-open No. 39525/1985) (Toshiba Netsu-Kigu Kabushiki Kaisha), Mar. 19, 1985, Full text; Figs. 1 to 4 (Family: none).

* cited by examiner

*Primary Examiner* — Renee Luebke
*Assistant Examiner* — Lheiren Mae Caroc
(74) *Attorney, Agent, or Firm* — Kratz, Quintos & Hanson, LLP

(57) ABSTRACT

A switch (50) is adapted to be On when a contact point (52) is at a position to be in contact with a cam surface (47) and Off when the contact point (52) is at a position corresponding to a non-cam surface (48). In the vicinity of the non-cam surface (48) of the cam surface (47), a rib (49) is provided which changes a direction of the contact point (52) when reciprocation of the cam member (43) is changed. Accordingly, even when the switch (50) comes into contact with the cam member (43) moving in a different direction, the direction of the contact point (52) is changed so as to be the same. Hence, the switch (50) is prevented from being affected by a hysteresis caused by difference in directions of the contact point (52).

1 Claim, 11 Drawing Sheets

SWITCH MECHANISM AND DISK DEVICE

TECHNICAL FIELD

The present invention relates to a switch mechanism having a cam member adapted so as to reciprocate in directions intersecting with an in-and-out direction of a contact point of a switch, and a disc device equipped with the switch mechanism.

BACKGROUND ART

Conventionally, there has been known a disc device of this type, which includes an information processing section that reads out information recorded on an optical disc and/or records information on an optical disc, a transfer mechanism that transfers the information processing section to a predetermined position and a conveying mechanism that carries an optical disc into an internal predetermined position and takes out the optical disc therefrom.

The transfer mechanism or the conveying mechanism is provided with an interlocking mechanism such as an arm or a cam member. The interlocking mechanism is coupled with a driving source such as a motor. The cam member is provided with one of various switch mechanisms for controlling the driving source.

Some switch mechanisms include a switch 100, a switch body 102 of which is provided with a contact point 101 adapted so as to come out and to be pressed in, and a cam member 200 arranged so as to reciprocate in directions orthogonal to the in-and-out direction of the contact point 101 of the switch 100 as shown in FIGS. 1A to 1D and FIGS. 2A to 2D.

The cam member 200 has a cam surface 201 and non-cam surfaces 202 formed at ends of the cam surface 201. When the contact point 101 is in contact with the cam surface 201, the switch is On. When the contact point is at a position corresponding to the non-cam surfaces 202, the switch is Off. Reciprocation of the cam member 200 turns the switch On and Off. In the disc device, since a complicated control is required, the cam member 200 reciprocates in a complicated manner.

The switch 100 is adapted to be Off when the contact point 101 of the switch 100 is out of contact with the cam surface 201 of the cam member 200 and is at a position corresponding to the non-cam surface 202 as shown in FIG. 1A. From this state, when the cam member 200 advances in a direction indicated with an arrow P, the contact point 101 comes into contact with the cam surface 201 and is pressed into the switch body 102 as shown in FIG. 1B, thereby turning the switch 100 On. At this time, since a small friction is generated between the contact point 101 and the cam member 200, an end of the contact point 101 is pulled to be inclined in the movement direction of the cam member 200.

While the cam member 200 further advances, the switch 100 is kept On as shown in FIG. 1C. Then, the contact point 101 of the switch 100 comes out of contact with the cam surface 201 of the cam member 200 as shown in FIG. 1D and comes to a position corresponding to the non-cam surface 202, thereby turning the switch 100 Off.

When the cam member 200 retracts in a direction indicated with an arrow Q opposite to the direction of the arrow P as shown in FIG. 2A, the contact point 101 comes into contact with the cam surface 201 again and is pressed into the switch body 102, thereby turning the switch 100 On. At this time, the end of the contact point 101 is inclined in an opposite direction of FIG. 1B. The cam member 200 retracts to a predetermined position and stops there as shown in FIG. 2B. After the cam member 200 advances again, the cam member 200 retracts as shown in FIG. 2C and then advances, the contact point 101 of the switch 100 comes out of contact with the cam surface 201 of the cam member 200 again and comes to a position corresponding to the non-cam surface 202, thereby turning the switch 100 Off. Herein, the direction of the inclination of the end of the contact point 101 is the same as the inclination shown in FIG. 2A but the opposite of the inclination shown in FIG. 1B.

Comparing to the switch mechanism shown in FIG. 1D with the switch mechanism shown in FIG. 2D, the both are the same in that the contact point 101 is at a position apart from the cam surface 201 as a result of an advancement of the cam member 200, but are different in directions of the inclination of the contact point 101 immediately before coming to the position. Therefore, in the switch mechanism, the sensitivity of the switch varies due to a hysteresis generated on the switch 100.

In order to eliminate a disadvantage due to the hysteresis, software has been proposed which contains information on differences in operation of the contact point 101 depending on the directions of the movement of the contact point 101 in order to adjust the differences by changing an operation time.

DISCLOSURE OF THE INVENTION

Problems to be Solved by the Invention

In the conventional switch mechanism, software is provided to eliminate a disadvantage due to the generation of hysteresis. However, to provide the software, it is necessary to comprehend differences in operation of the switch 100 depending on directions of the contact point 101, which is burdensome in designing such software. Further, the contact point 101 and the cam member 200 contain differences depending on component parts. Therefore, the software has to be designed while taking into consideration such differences. Furthermore, even when the operation time is controlled by the software, a load applied on the cam member 200 may vary depending on temperature changes and/or accuracy of component parts, resulting in such a disadvantage that the cam member 200 does not stop at an intended position.

Thus, as long as such software is used, the related art has problems such that the structure becomes complicated to eliminate a hysteresis of the contact point.

In view of the above-described circumstances, an object of the present invention is to provide a switch mechanism, which is capable of eliminating a hysteresis of a contact point with a simple structure, and a disc device.

Means for Solving the Problems

A switch mechanism according to an aspect of the present invention includes a switch provided with a contact point adapted to come out and to be pressed in a switch body, and a cam member formed with a cam surface that presses the contact point and a non-cam surface that allows the contact point to come out. The cam member is arranged to reciprocate in directions intersecting with an in-and-out direction of the contact point of the switch, the switch mechanism being arranged so that the switch is in one state of "On" and "Off" when the contact point is at a position in contact with the cam surface and is in the other state of "On" and "Off" when the contact point is at a position corresponding to the non-cam surface. In the vicinity of the non-cam surface, the cam surface is provided with a switching unit that changes the direction of the contact point when reciprocation of the cam member is inverted.

A disc device of an aspect of the present invention includes the aforesaid switch mechanism.

EXPLANATION OF CODES

Figure 1A:
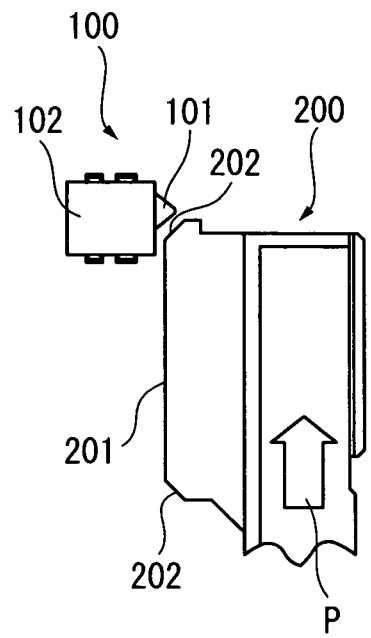
FIG. 1A is a plan view illustrating operation of a switch mechanism of the related art.
Figure 1B:
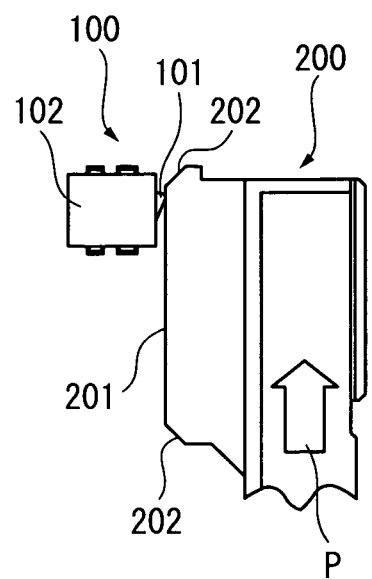
FIG. 1B is a plan view illustrating operation of the switch mechanism of the related art.
Figure 1C:
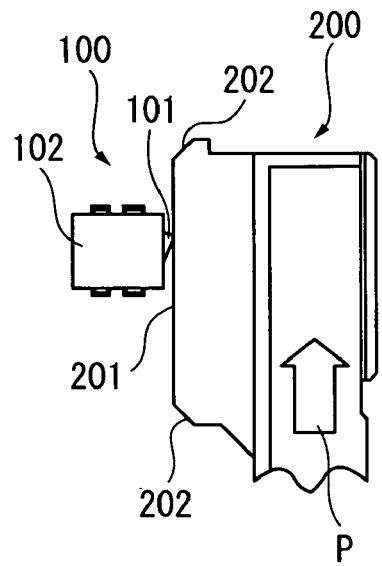
FIG. 1C is a plan view illustrating operation of the switch mechanism of the related art.
Figure 1D:
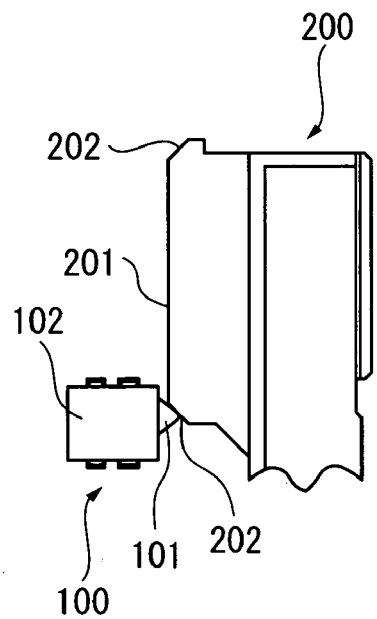
FIG. 1D is a plan view illustrating operation of the switch mechanism of the related art.
Figure 2A:
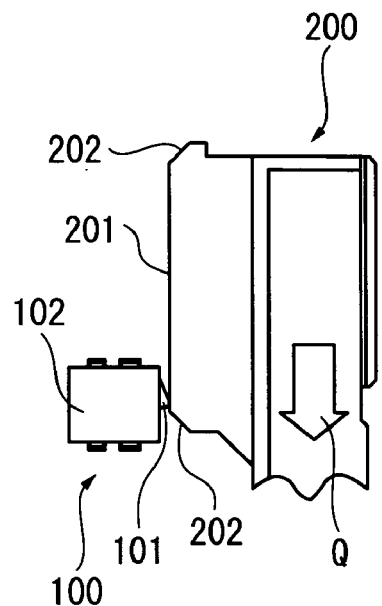
FIG. 2A is a plan view illustrating operation of the switch mechanism of the related art.
Figure 2B:
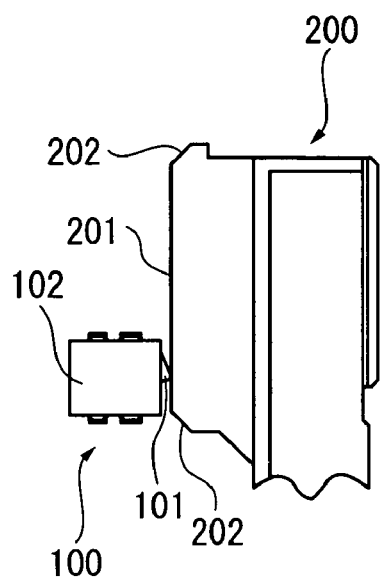
FIG. 2B is a plan view illustrating operation of the switch mechanism of the related art.
Figure 2C:
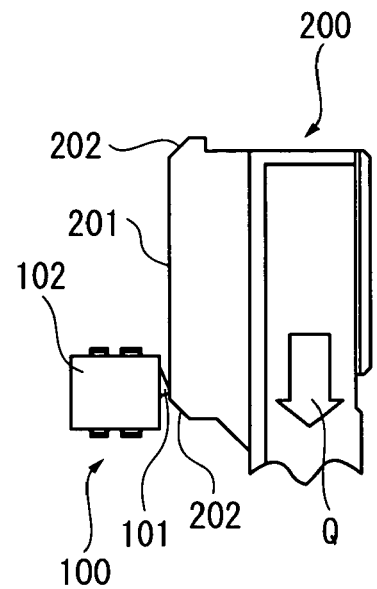
FIG. 2C is a plan view illustrating operation of the switch mechanism of the related art.
Figure 2D:
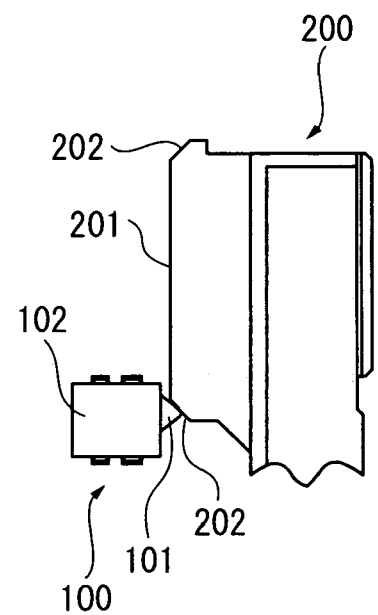
FIG. 2D is a plan view illustrating operation of the switch mechanism of the related art.

43 . . . cam member
46 . . . cam portion
47 . . . cam surface
48 . . . non-cam surface
49 . . . rib (switching unit)
50 . . . switch
51 . . . switch body
52 . . . contact point

BEST MODE FOR CARRYING OUT THE INVENTION

An embodiment of the present invention will be described with reference to the drawings.

In this embodiment, a disc recording medium may be read-only or write-only. Also, not limited to an optical disc, the disc recording medium includes any disc recording medium such as a magnetic disc and a magnetooptical disc. A disc device will be exemplified by a so-called thin slot-in type disc device typically built into electric devices such as a portable personal computer. However, the disc device may be a standalone device such as a game console and a reproducing device for recording and reproducing image data or the like. In addition, the disc device is not necessarily thin.

(Arrangement of Disc Device)

Figure 3:
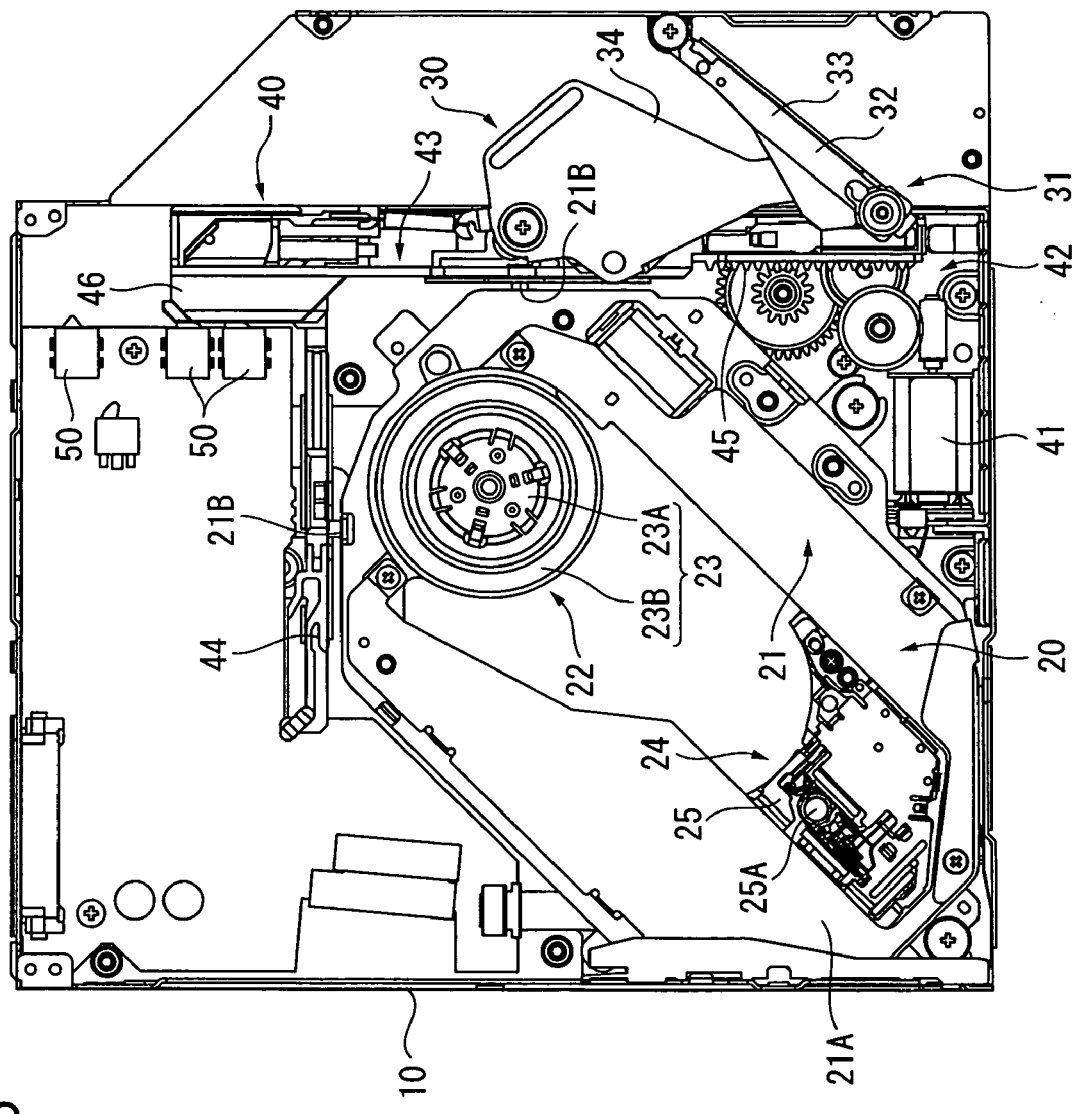
FIG. 3 is a plan view schematically showing a disc device of an embodiment of the present invention, a part of which is removed.

Referring to FIG. 3, a disc device of this embodiment is a so-called thin slot-in type disc device, which is mounted, for example, on an electric device such as a portable personal computer. The disc device performs read-out processing and recording processing as information processing. That is, the disc device reads out information recorded on a recording surface (not shown) provided on at least one surface of an optical platter disc as a disc recording medium, which is loaded thereon and unloaded therefrom, and records various kinds of information on the recording surface.

The disc device includes a substantially box-like case 10 made of, for example, a metal, which has an internal space therein.

The case 10 has a decorative plate (not shown) on an open side face thereof. The decorative plate is formed with an opening (not shown) in a slit-like shape along a longitudinal direction in a central portion thereof. The optical disc is inserted and taken out through the opening.

In the case 10, a disc handling section 20 that is a so-called traverse mechanism, a conveying mechanism 30 for conveying an optical disc 1 and a control circuit section (not shown) are disposed.

The disc handling section 20 has a substantially plate-like base section 21, which is made of, for example, a metal plate formed in a flat octagonal shape as seen in plan view.

On the base section 21, a disc rotation driver 22 is disposed. The disc rotation driver 22 includes a spindle motor (not shown) and a turntable 23 integrally attached to an output shaft of the spindle motor. The spindle motor is connected to the control circuit section so as to be controlled thereby, and is driven with electric power supplied from the control circuit section.

The turntable 23 is an axially supporting section including a rotary shaft 23A, which has a substantially columnar shape and is inserted into a shaft hole formed in the center of the optical disc, and a collar portion 23B formed so as to protrude like a flange on a circumferential surface of the rotary shaft 23A, on which a periphery of the shaft hole in the optical disc is placed so as to support the disc. The turntable 23 is turned by the spindle motor together with the optical disc axially supported thereby.

In the base section 21, an information processing section 24 is disposed. The information processing section 24 is supported to be bridged between a pair of guide shafts (not shown), and the information processing section 24 is moved closer to and away from the turntable 23 with a transfer mechanism (not shown).

The information processing section 24 includes a pickup 25 having a light source (not shown), a lens 25A for converging light from the light source and an optical sensor (not shown) for detecting outgoing light reflected by the optical disc.

The pickup 25 is connected to the control circuit section such that signals are transmitted therebetween. The pickup 25 performs read processing to read out various kinds of information recorded on the recording surface of the optical disc 1 and outputs signals to an output circuit section and performs recording processing to record various kinds of information from the control circuit section on the recording surface in accordance with the control of the control circuit section.

The base section 21 is integrally attached with a cover 21A. The cover 21A is formed with an elongated processing opening, which is formed in a substantially central area along a longitudinal direction of the base section 21 corresponding to a transfer path of the pickup 25 and the position of the turntable 23.

The base section 21 is disposed so as to swing within the case 10 with a base end portion as a pivot of the swing, the base end portion located at a side opposite to one end side where the disc rotation driver 22 is disposed, and the one end portion as the end of the swing at the side of the disc rotation driver 22.

A drive section 40 that drives the base section 21 to swing is disposed within the case 10. The drive section 40 includes a motor 41 as a driving source, the operation of which is controlled by, for example, the control circuit section (not shown), and a cam member 43 to which a driving force of the motor 41 is transmitted via a gear mechanism 42.

The cam member 43 engages with an outwardly protruding engagement catch 21B provided to the base section 21 and is driven to move by a driving force of the motor 41 to swing the base section 21.

The base section 21 is provided with another outwardly protruding engagement catch 21B. The engagement catch 21B is driven by a motor (not shown) via a moving cam 44 to swing the base section 21.

The conveying mechanism 30 includes a link mechanism 31 that is linked with the motor 41 and driven thereby.

The link mechanism 31 includes an eject arm and a hold arm (which are not shown) and a loading arm 32. These arms are formed in a long plate shape of, for example, a metal plate or the like, and each of the arms is pivoted onto the case 10 at one end portion in a longitudinal direction thereof.

The loading arm 32 includes a first link 33, which is disposed so that one end thereof can rotate inwardly in the vicinity of the opening of the case 10, and a second link 34, one end of which is connected to the first link 33, and the other end thereof is connected to the cam member 43.

In the case 10, a plurality of switches 50 is disposed. These switches 50 output On/Off signals synchronously with the movement of the cam member 43, the On/Off signals are outputted to the control circuit section (not shown).

The control circuit section is composed of, for example, a circuit on a circuit board, which is mounted with various electric components, and controls the entire operation of the disc device. When the control circuit section detects an insertion of an optical disc; i.e., when recognizing that the detection switches have been turned Off based on the On/Off signals from the switches 50 of the conveying mechanism 30, the control circuit section determines that the optical disc is inserted, and controls the drive section to drive the disc handling section 20 to swing. Also, when the control circuit section recognizes that, for example, an eject button for requesting ejection of the optical disc is operated, or when recognizing an instruction signal requesting to eject the optical disc from the electric device, the control circuit section controls the motor to drive the information processing section 24 to move to the end position at the side of rotation end of the base section 21. Further, when the control circuit section recognizes that the information processing section 24 has moved to the end position, the control circuit section controls the drive section to drive the disc handling section 20 to rotate. Then, the control circuit section controls a conveyance motor of the conveying mechanism 30 to drive the link mechanism 31 to move to eject the optical disc through the opening.

Figure 4:
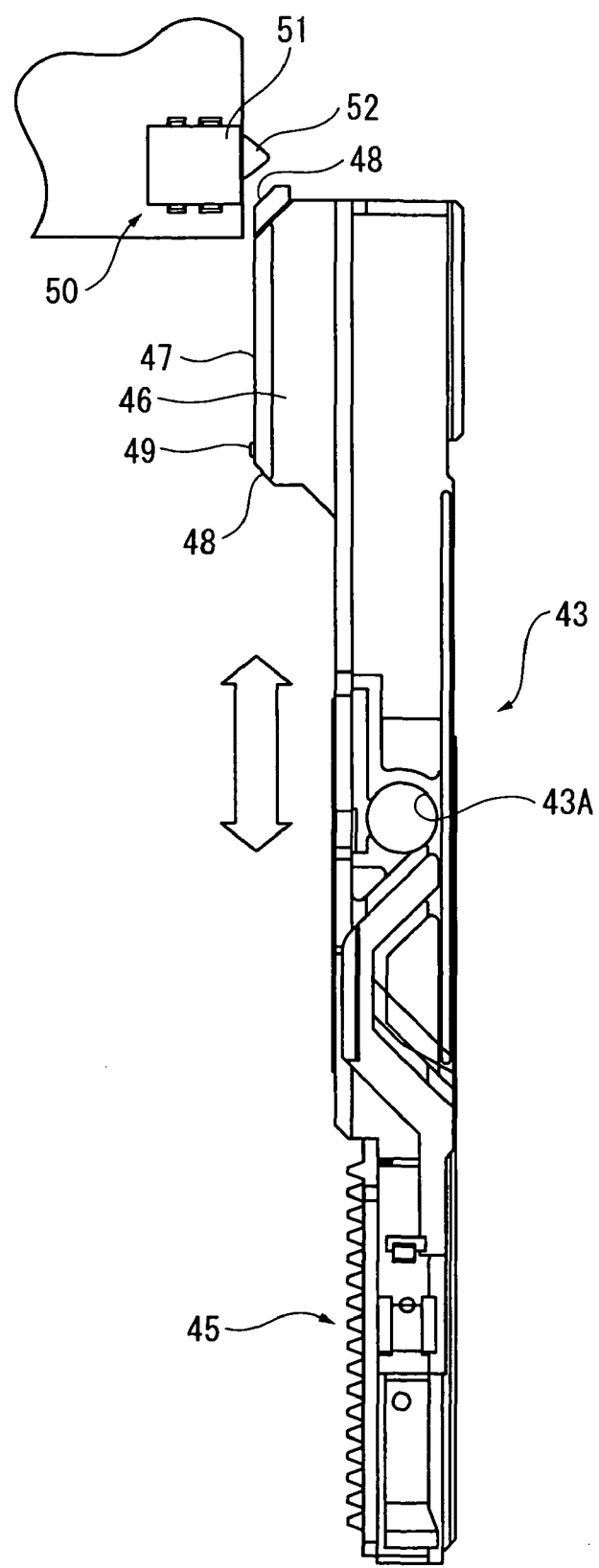
FIG. 4 is a plan view showing a switch mechanism.
Figure 5:
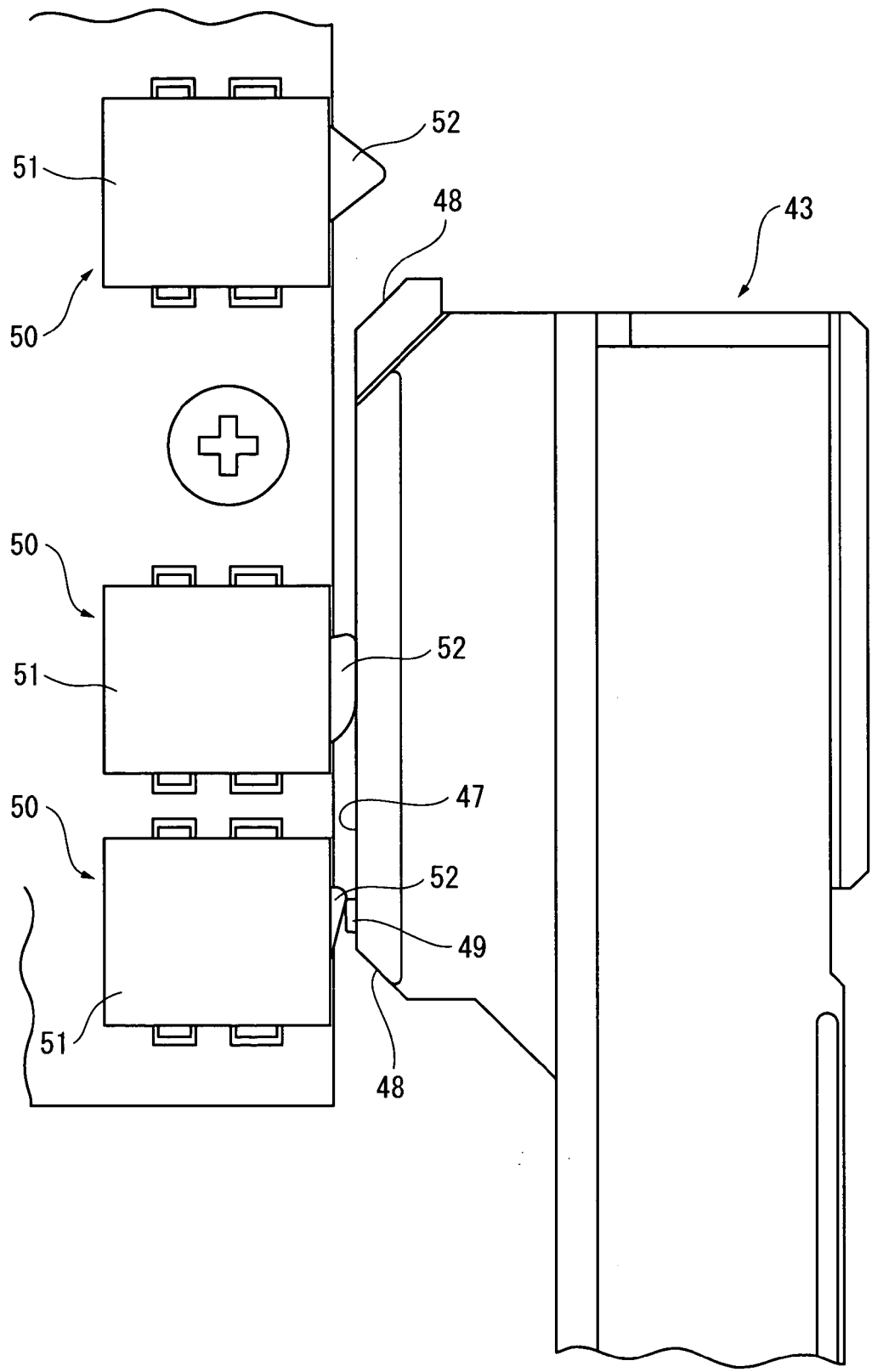
FIG. 5 is a plan view showing a primary part of the switch mechanism.

Referring to FIG. 4 and FIG. 5, the switch 50 includes a switch body 51 and a contact point 52, which is arranged so as to come out from and to be pressed into the switch body 51.

The in-and-out direction of the contact point 52 is orthogonal to a movement direction of the cam member 43. The contact point 52 has a substantially triangle shape as seen in plan view and has an end portion, which is inclined as the cam member 43 reciprocates.

The cam member 43 is a substantially long member made of a synthetic resin integrally formed with a rack portion 45 disposed at one end and a cam portion 46 disposed at the other end thereof. The cam member 43 is arranged so as to reciprocate along a longitudinal direction thereof. The cam member 43 is formed with a support hole 43A for rotatably supporting the second link 34 in a central area thereof.

The rack portion 45 is meshed with the gear mechanism 42 and is driven to reciprocate by the rotation of the motor 41.

The cam portion 46 is formed with a flat cam surface 47 along the reciprocation direction of the cam member 43. The cam surface 47 is for pressing the contact point 52 into the switch body 51. When the contact point 52 is pressed, the switch 50 is On.

At the both ends of the cam surface 47 in the movement direction of the cam member 43, non-cam surfaces 48 are formed respectively. The non-cam surfaces 48 allow the contact point 52 to come out from the switch body 51. When the contact point 52 comes out from the switch body 51, the switch 50 is Off.

In one end portion of the cam surface 47; i.e., at a point in the vicinity of one of the two non-cam surfaces 48, a rib 49 having a rectangular shape is integrally formed.

The rib 49 functions as a switching unit for changing the direction of the contact point 52 when the reciprocation of the cam member 43 is inverted. The direction of the end portion of the contact point 52 is changed when the end portion of the contact point 52 is brought into contact with a rising surface (a surface orthogonal to the cam surface 47) of the rib 49. The rib 49 is formed integrally with the cam portion 46. The rib 49 is formed so that one end thereof is at a predetermined distance away from a boundary between the non-cam surface 48 and the cam surface 47.

(Operation of Switch Mechanism)

Operation of the switch mechanism in the embodiment will be described below with reference to FIG. 6 and FIG. 7.

Figure 6A:
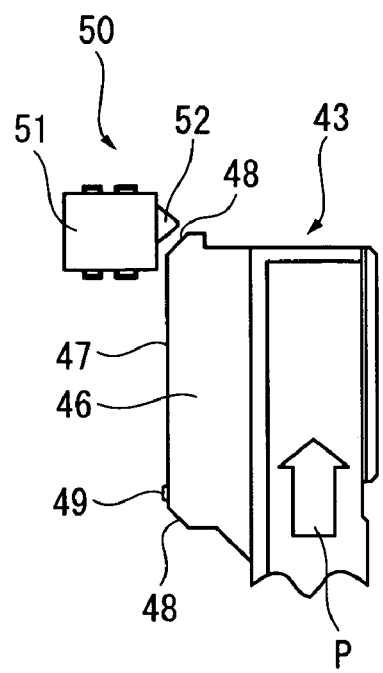
FIG. 6A illustrates operation of the switch mechanism.
Figure 6B:
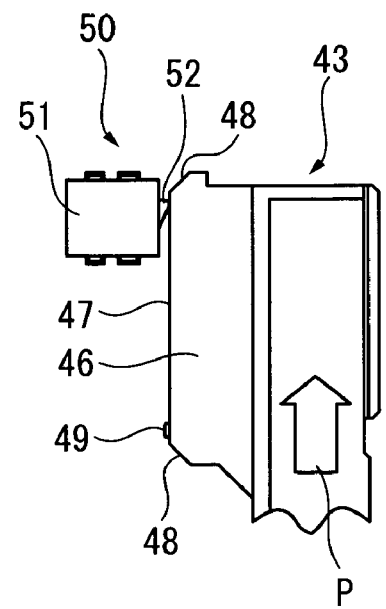
FIG. 6B illustrates operation of the switch mechanism.

As shown in FIG. 6A, when the contact point 52 of the switch 50 is positioned at a point corresponding to the non-cam surface 48 away from the cam surface 47 of the cam member 43, the switch 50 is Off. From this state, when the cam member 43 advances in a direction indicated with an arrow P, the contact point 52 is brought into contact with the cam surface 47 and pressed into the switch body 51, thereby turning the switch 50 On as shown in FIG. 6B. At this time, the end of the contact point 52 is pulled by the cam member 43 as the cam member 43 advances, and thus the contact point 52 is inclined.

Figure 6C:
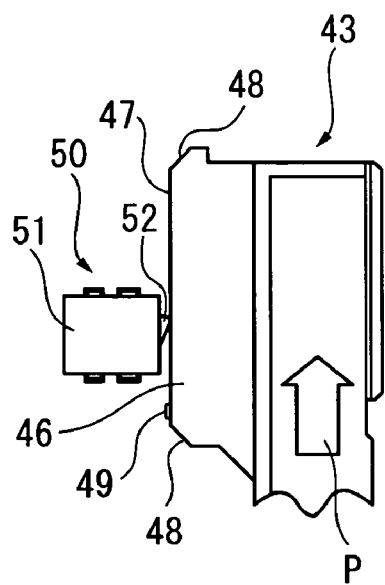
FIG. 6C illustrates operation of the switch mechanism.
Figure 6D:
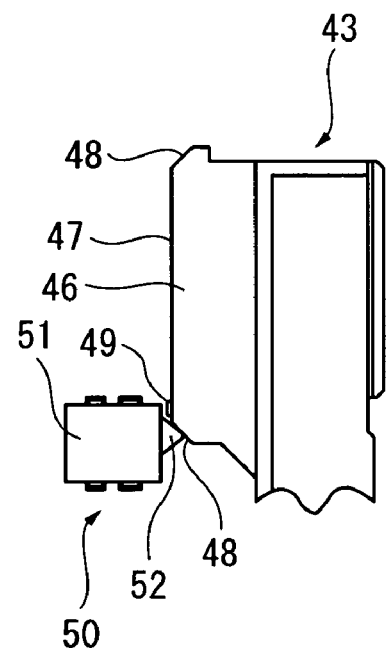
FIG. 6D illustrates operation of the switch mechanism.

While the cam member 43 further advances, the switch 50 is kept On as shown in FIG. 6C. After that, when the contact point 52 of the switch 50 overleaps the rib 49 and comes to a position corresponding to the non-cam surface 48 out of the cam surface 47 of the cam member 43 as shown in FIG. 6D, the contact point 52 comes out from the switch body 51, thereby turning the switch 50 Off.

Figure 7A:
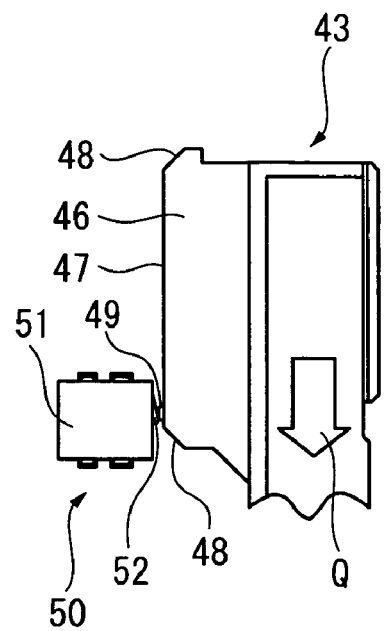
FIG. 7A illustrates operation of the switch mechanism.
Figure 7B:
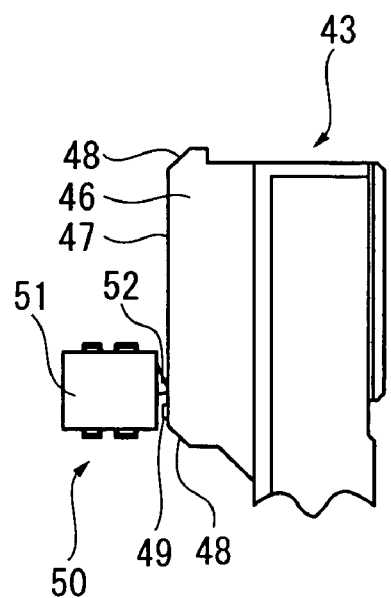
FIG. 7B illustrates operation of the switch mechanism.
Figure 7C:
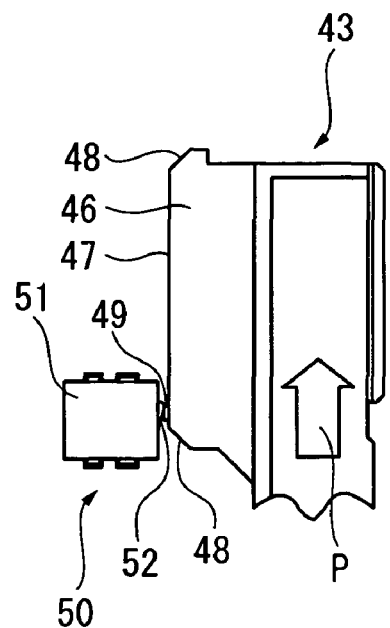
FIG. 7C illustrates operation of the switch mechanism.

As shown in FIG. 7A, when the cam member 43 retracts in the direction of an arrow Q opposite to the direction of the arrow P, the contact point 52 is brought into contact with the cam surface 47 again and pressed into the switch body 51, thereby turning the switch 50 On. At this time, the end of the contact point 52 is inclined to an opposite direction of FIG. 6B. The cam member 43 retracts to a predetermined position and stops there as shown in FIG. 7B. When the cam member 43 advances again in the P-direction as shown in FIG. 7C, the end portion of the contact point 52 is brought into contact with the rising surface of the rib 49. While the end thereof is stopped, the base side of the contact point 52 continues to advance with the switch body 51 as the cam member 43 further advances. Accordingly, the direction of the inclination of the contact point 52 is inverted from the state shown in FIG. 7B.

Figure 7D:
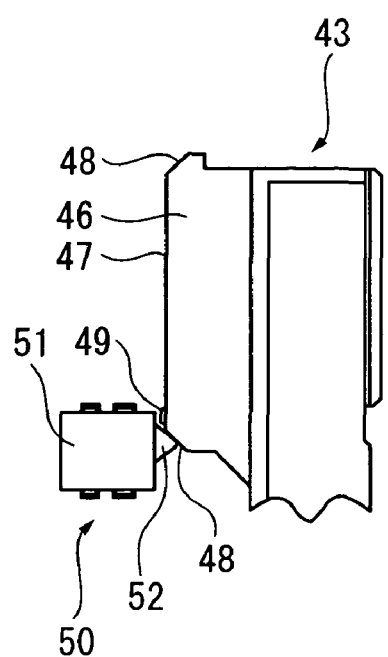
FIG. 7D illustrates operation of the switch mechanism.

When the cam member 43 further advances, the contact point 52 of the switch 50 comes off the cam surface 47 of the cam member 43 again as shown in FIG. 7D and the cam member 43 comes to a position corresponding to the non-cam surface 48. Accordingly, the contact point 52 comes out, thereby turning the switch 50 Off. At this time, the end of the contact point 52 is inclined in the same direction as that shown in FIG. 6D. Therefore, no hysteresis occurs on the contact point 52.

Effects of Embodiment

The embodiment includes effects exemplified below.
(1) The switch mechanism of the embodiment includes the switch 50 provided with the contact point 52 adapted to come out from and to be pressed into the switch body 51 thereof, and the cam member 43 which is formed with the cam surface 47 that presses the contact point 52 and the non-cam surface 48 that allows the contact point 52 to come out and is arranged to reciprocate in directions intersecting with the in-and-out direction of the contact point 52 of the switch 50, the switch mechanism being arranged so that the switch 50 is On when the contact point 52 is at a position in contact with the cam surface 47 and Off when the contact point 52 is at a position corresponding to the non-cam surface 48. In the vicinity of the non-cam surface 48 of the cam surface 47, the switching unit (the rib 49) is provided which changes the direction of the contact point 52 when the reciprocation of the cam member 43 is inverted. Therefore, even when the switch 50 comes into contact with the cam member 43 moving in a different direction, the direction of the contact point 52 is changed so as to be the same by the switching unit. Hence, the switch 50 is prevented from being affected by a hysteresis caused by difference in directions of the contact point 52. Moreover, unlike the related art in which software is used to prevent influence of hysteresis, the switching unit is formed on the cam member, thereby simplifying the structure of the switch mechanism.
(2) Since the switching arrangement is the rib 49, which can be easily molded. Accordingly, the structure of the switching unit can be simplified.
(3) Since the rib 49 is molded integrally with the cam member 43, the cam member 43 formed with the rib 49 can be easily molded by an appropriate molding method such as injection molding.
(4) Since the rib 49 is formed in a rectangular shape, the cam surface 47 and the rising surface of the rib 49 can be substantially orthogonal to each other. The rib 49 does not allow the contact point 52 to slip over the rib 49 but can securely stop the contract point 52, thereby the direction of the contact point 52 is reliably changed.
(5) Since the disc device of the embodiment includes the above-described switch mechanism, the structure of the switch mechanism is simple. The switch 50 is free from influence of the hysteresis, so that the conveying mechanism and the like can operate precisely.

Modifications

The present invention is not limited to the above-described embodiment. The present invention includes the following exemplary modifications in the scope of the invention.

For example, in the above-described embodiment, the rib 49 is employed as the switching unit, but the present invention is not limited thereto.

For example, a tape having a large friction resistance may be attached to a predetermined position of the cam surface 47 as an alternative for the rib, or a concave portion may be formed in the cam surface 47. In the case of the concave portion, a too deep concave may cause the switch 50 to be switched from On to Off when the contact point 52 enters the concave portion. Therefore, the concave portion should have a depth not enough to switch the switch 50.

When the switching unit is the rib 49, the arrangement is not limited to that of the above-described embodiment. For example, the rib 49 may be molded separately from the cam member 43 and bonded to the cam member 43 with an adhesive. The shape of the rib 49 is not limited to a rectangle, but may be a trapezoid or a triangle.

Further, the in-and-out direction of the contact point 52 may not to be perpendicular to the reciprocation direction of the cam member 43. If the contact point 52 can come out and be pressed as the cam member 43 reciprocates, the in-and-out direction and the reciprocation direction may not intersect exactly at right angles.

The switch 50 is adapted to turn On when the contact point 52 is pressed into the switch body 51. However, the switch 50 may be adapted to turn Off when the contact point 52 is pressed.

The disc device, which uses a disc recording medium, has been described as one example. As described above, the disc recording medium is not limited to the optical disc but may be any disc recording medium such as a magnetic disc and a magnetooptical disc.

The disc drive may process a disc recording medium which is read-only or write-only.

In the present invention, in addition to the disc device, the switch mechanism is applicable to other electronic devices, for example, to an audio device.

In addition, practical structures and procedures for implementing the present invention may be appropriately selected within a range in which an object of the invention can be achieved.

Advantages of Embodiment

As described above, the switch mechanism includes the switch 50 provided with the contact point 52 adapted to come out from and to be pressed into the switch body 51 thereof, and the cam member 43 which is formed with the cam surface 47 that presses the contact point 52 and the non-cam surface 48 that allows the contact point 52 to come out and is arranged to reciprocate in directions intersecting with the in-and-out direction of the contact point 52 of the switch 50, the switch mechanism being arranged so that the switch 50 is in one state of "On" and "Off" when the contact point 52 is at a position in contact with the cam surface 47 and is in the other state of "On" and "Off" when the contact point 52 is at a position corresponding to the non-cam surface 48. In the vicinity of the non-cam surface 48 of the cam surface 47, the rib 49 is provided as the switching unit that changes the direction of the contact point 52 when the reciprocation of the cam member 43 is changed. Therefore, even when the switch 50 comes into contact with the cam member 43 moving in a different direction, the direction of the contact point 52 is changed so as to be the same by the rib 49. Hence, the switch 50 is prevented from being affected by a hysteresis caused by difference in directions of the contact point 52. Moreover, unlike the related art in which software is used to prevent influence of hysteresis, the rib 49 is formed on the cam member 43. Accordingly, the structure of the switch mechanism is simplified.

INDUSTRIAL APPLICABILITY

The present invention is applicable to a switch mechanism, in which a cam member is arranged so as to reciprocate in directions intersecting with an in-and-out direction of a contact point of a switch, and to a disc device equipped with the switch mechanism.

The invention claimed is:

1. A disc device, comprising:
   a switch provided with a contact point adapted to come out from and to be pressed into a switch body;
   an information processing section which includes a pickup;
   a base section in which the information processing section is disposed; and
   a drive section which drives the base section to swing, the drive section including: a motor, and a cam member in which a rack portion being meshed with a gear mechanism to receive a driving force of the motor via the gear mechanism and a cam portion are formed integrally with each other,
   the cam member being formed with a cam surface that presses the contact point and non-cam surfaces that allow the contact point to come out and being arranged to reciprocate in directions intersecting with an in-and-out direction of the contact point of the switch, the non-cam surfaces being respectively provided at both ends of the cam surface in a reciprocating direction of the cam surface, wherein:
   the switch is in one state of "On" and "Off" when the contact point is at a position in contact with the cam surface and is in the other state of "On" and "Off" when the contact point is at positions corresponding to the non-cam surfaces,
   in the vicinity of the non-cam surfaces, the cam surface is provided with a switching unit that changes a direction of the contact point when reciprocation of the cam member is inverted,
   the switching unit is a rib which is formed in a rectangular shape, and
   the contact point has a substantially triangle shape with an end portion which is inclined as the cam member reciprocates.

* * * * *